United States Patent [19]
Ito et al.

[11] Patent Number: 5,447,697
[45] Date of Patent: Sep. 5, 1995

[54] METAL CATALYST CARRIER

[75] Inventors: Keiji Ito, Nagoya; Yasushi Shimizu, Okazaki; Kiyotaka Matuo, Nukata; Yasuyuki Kawabe, Okazaki; Masao Yokoi, Takahama; Tosiharu Konda, Toyoake; Takashi Obata, Kariya, all of Japan

[73] Assignees: Nippondenso Co., Ltd., Kariya; Nippon Soken Inc., Nishio, both of Japan

[21] Appl. No.: 51,731

[22] Filed: Apr. 23, 1993

[30] Foreign Application Priority Data

Apr. 24, 1992 [JP] Japan ................... 4-131882

[51] Int. Cl.⁶ .................. B01D 53/34; B32B 3/12; B32B 15/00
[52] U.S. Cl. ................... 422/179; 422/180; 428/593; 428/594
[58] Field of Search ............. 422/179, 180; 502/439, 502/527; 428/593, 594; 29/890

[56] References Cited

U.S. PATENT DOCUMENTS

| | | | |
|---|---|---|---|
| 3,537,226 | 11/1990 | Le Van et al. | 53/24 |
| 4,400,860 | 8/1983 | Nonnenmann et al. | 29/157 R |
| 4,519,120 | 5/1985 | Nonnenmann et al. | 29/157 R |
| 4,559,205 | 12/1985 | Hood | 422/180 |
| 5,055,275 | 10/1991 | Kanniainen et al. | 422/179 X |
| 5,065,576 | 11/1991 | Kanazawa et al. | 422/180 X |
| 5,169,604 | 12/1992 | Crothers, Jr. | 422/179 X |
| 5,304,351 | 4/1994 | Tanaka et al. | 422/180 |

FOREIGN PATENT DOCUMENTS

| | | |
|---|---|---|
| 0306705 | 3/1989 | European Pat. Off. |
| 1242152 | 9/1989 | Japan |
| 2063555 | 3/1990 | Japan |
| 2-273549 | 11/1990 | Japan |
| 3165842 | 7/1991 | Japan |
| 4180838 | 6/1992 | Japan |

Primary Examiner—Robert J. Warden
Assistant Examiner—Robert Carpenter
Attorney, Agent, or Firm—Cushman, Darby & Cushman

[57] ABSTRACT

A metal catalyst carrier for exhaust gas purification, comprising: a metal honeycomb column composed of flat and wavy metal sheets laminated, wound together, and bonded to each other to provide numerous exhaust gas flow paths along the column axis, the honeycomb column having a quasi-elliptical cross section defined by a pair of mutually facing linear portions and a pair of mutually facing curved portions in a plane perpendicular to the column axis, the flat and wavy sheets being bonded in a greater bond rate in the major axial end portions than in the other portion of the quasi-ellipse, the bond rate being defined as a quotient obtained by dividing a bonded length by a total length of lines on which the laminated and wound flat and wavy sheets are in contact with each other; and a columnar metal case fittingly enclosing the honeycomb column and bonded to the honeycomb column only in the portions corresponding to the curved portions of the quasi-elliptical cross section.

10 Claims, 15 Drawing Sheets

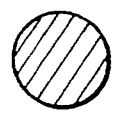 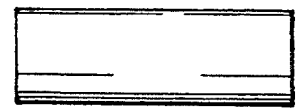
Fig. 7A1    Fig. 7A2
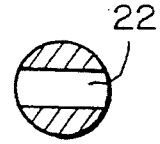 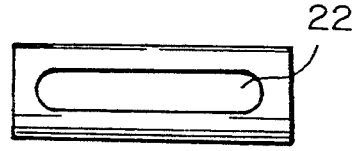
Fig. 7B1    Fig. 7B2
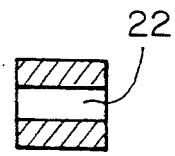 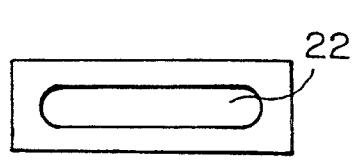
Fig. 7C1    Fig. 7C2
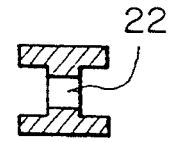 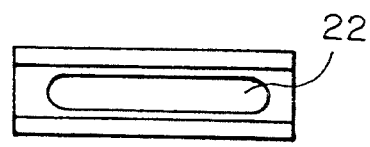
Fig. 7D1    Fig. 7D2

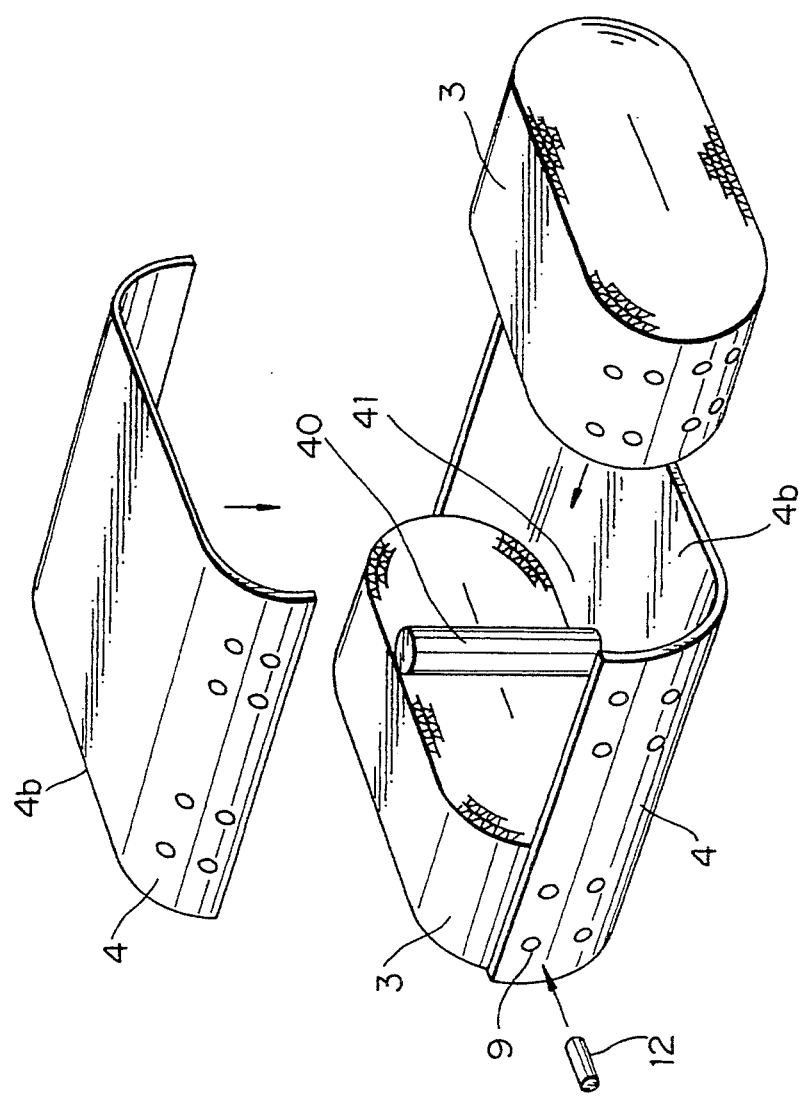

METAL CATALYST CARRIER

BACKGROUND OF THE INVENTION

1. Field of the Invention

The present invention relates to a metal catalyst carrier, particularly to such having a quasi-elliptical cross section and a resistance to thermal stress.

2. Description of the Related Art

Catalyst carriers, such as those carrying a catalyst for purifying automobile exhaust gas, must be lightweight and resistant to vibration impact. For such applications, a known metal honeycomb column is composed of flat and wavy sheets or foils, of a heat-resisting ferritic stainless steel, for example, laminated, wound together and bonded to each other.

This type of metal catalyst carrier, satisfying the above-mentioned properties, has an about ten times greater thermal expansion coefficient than that of ceramic catalyst carriers, so that thermal stress which occurs when the automobile engine stops may cause a failure at the bond between the flat and wavy sheets and/or at the bond between the metal honeycomb column and a columnar metal case fittingly enclosing the honeycomb column.

As a solution to this problem, Japanese Unexamined Patent Publication (Kokai) No. 2-273549 proposed a metal honeycomb column having a circular cross section, in which flat and wavy sheets are bonded at a smaller bond rate in the peripheral portion than in the core portion of the honeycomb column. The bond rate is defined as a number or quotient obtained by dividing a bonded area by a total area in which the laminated and wound flat and wavy sheets meet or are in contact with each other.

It is currently desired, however, that a catalyst carrier should be flat or have a quasi-elliptical cross section suitable for equipment in the limited underfloor space of automobiles. Such a quasi-elliptical cross section is subjected to a different distribution of thermally induced stress than a circular cross section. Moreover, a problem also arose in that the bond between the honeycomb column and the metal case enclosing the former is broken by thermally induced deformation of the catalyst carrier.

SUMMARY OF THE INVENTION

The object of the present invention is to provide a metal catalyst carrier having a quasi-elliptical cross section, in which a metal honeycomb column and a columnar metal case are firmly bonded so that no failure is caused by thermally induced stress.

To achieve the object according to a first aspect of the present invention, there is provided a metal catalyst carrier for exhaust gas purification, comprising:

- a metal honeycomb column composed of flat and wavy metal sheets laminated, wound together, and bonded to each other to provide numerous exhaust gas flow paths along the column axis, the honeycomb column having a quasi-elliptical cross section defined by a pair of mutually facing linear portions and a pair of mutually facing curved portions in a plane perpendicular to the column axis, the flat and wavy sheets being bonded in a greater bond rate in the major axial end portions than in the other portion of the quasi-ellipse, the bond rate being defined as a quotient obtained by dividing a bonded length by a total length of lines on which the laminated and wound flat and wavy sheets are in contact with each other; and
- a columnar metal case fittingly enclosing the honeycomb column and bonded to the honeycomb column only in the portions corresponding to the curved portions of the quasi-elliptical cross section.

Preferably, the flat and wavy metal sheets are bonded to provide a value C1/C2 of 2 or more, where C1 and C2 are values of the bond rate in the major axial end portions and in the portion between these portions of the quasi-elliptical cross section, respectively. More preferably, the flat and wavy metal sheets are bonded to provide a value C1/C2 of from 2 to 5.

Typically, a catalyst for exhaust gas purification is carried on the flat and wavy metal sheets.

According to a second aspect of the present invention, there is also provided a metal catalyst carrier for exhaust gas purification, comprising:

- a metal honeycomb column composed of flat and wavy metal sheets laminated, wound together, and bonded to each other to provide numerous exhaust gas flow paths along the column axis, the honeycomb column having a quasi-elliptical cross section defined by a pair of facing linear portions and a pair of facing curved portions in a plane perpendicular to the column axis, the flat and wavy sheets being bonded to each other at both ends of the honeycomb column;
- a columnar metal case fittingly enclosing the honeycomb column; and
- a metal member extending from the columnar metal case through to the inside of the enclosed metal honeycomb column only in a portion corresponding to the curved portions of the quasi-elliptical cross section to fasten one to the other of the latter two.

The flat and wavy metal sheets are preferably also bonded by welding either in the portion corresponding to the curved portion or in the portion bridging part of the curved portion and part of the linear portion.

A metal catalyst carrier for exhaust gas purification according to the present invention may further comprise:

- a plurality of the metal honeycomb columns arranged with the column axes aligned and the mutually facing column ends spaced apart in the columnar metal case; and
- a metal support member disposed within the space between the mutually facing ends of the metal honeycomb columns and having ends rigidly connected to mutually facing inner walls of the columnar metal case to connect and support the inner walls. Usually, the metal support member rigidly connects the mutually facing inner walls of the columnar metal case in the portion corresponding to the linear portion. Typically, a catalyst for exhaust gas purification is carried on the flat and wavy metal sheets.

At elevated temperatures, the quasi-elliptical cross section of the catalyst carrier tends to change in shape toward true circle, i.e., the minor axis tends to extend while the major axis tends to shrink.

According to the first aspect of the present invention, the flat and wavy sheets are bonded to each other in a greater bond rate in the major axial end portions than in the to other portion of the quasi-elliptical cross section, so that the major axial end portions are relatively more rigid than the other portion, the latter being lower in bond rate, less in rigidity and more easily deformable than the former.

The honeycomb column is bonded to the columnar case only in the portions corresponding to the major axial end portions, i.e., the area surrounded by the curved portions of the quasi-elliptical cross section, so that any expansion of the columnar case in the minor axial direction does not force the honeycomb column to deform outward.

The first aspect of the present invention thus effectively prevents breakage of the bond between the flat and wavy sheets of the honeycomb column and the bond between the honeycomb column and the columnar case.

According to the second aspect of the present invention, the flat and wavy sheets are bonded to each other by either electrical discharge machining or tungsten-inert gas welding at both ends of the honeycomb column, to strengthen the metal catalyst carrier as a whole. Moreover, the metal member extending from the columnar case through to the inside of the enclosed metal honeycomb column only in the portion corresponding to the curved portions, which are less deformable by heat than the linear portions, so that bond between the honeycomb column and the columnar case is strengthened sufficiently to prevent the honeycomb column from slipping along the columnar case by a strong exhaust gas flow.

BRIEF DESCRIPTION OF THE DRAWINGS

FIGS. 7A to 7D show metal pins with different shapes according to the present invention, in (a) cross sectional and (b) side views;

FIG. 16 shows a further embodiment of the metal catalyst carrier according to the present invention, in exploded view;

DESCRIPTION OF THE PREFERRED EMBODIMENTS

EXAMPLE 1

Figure 1A:
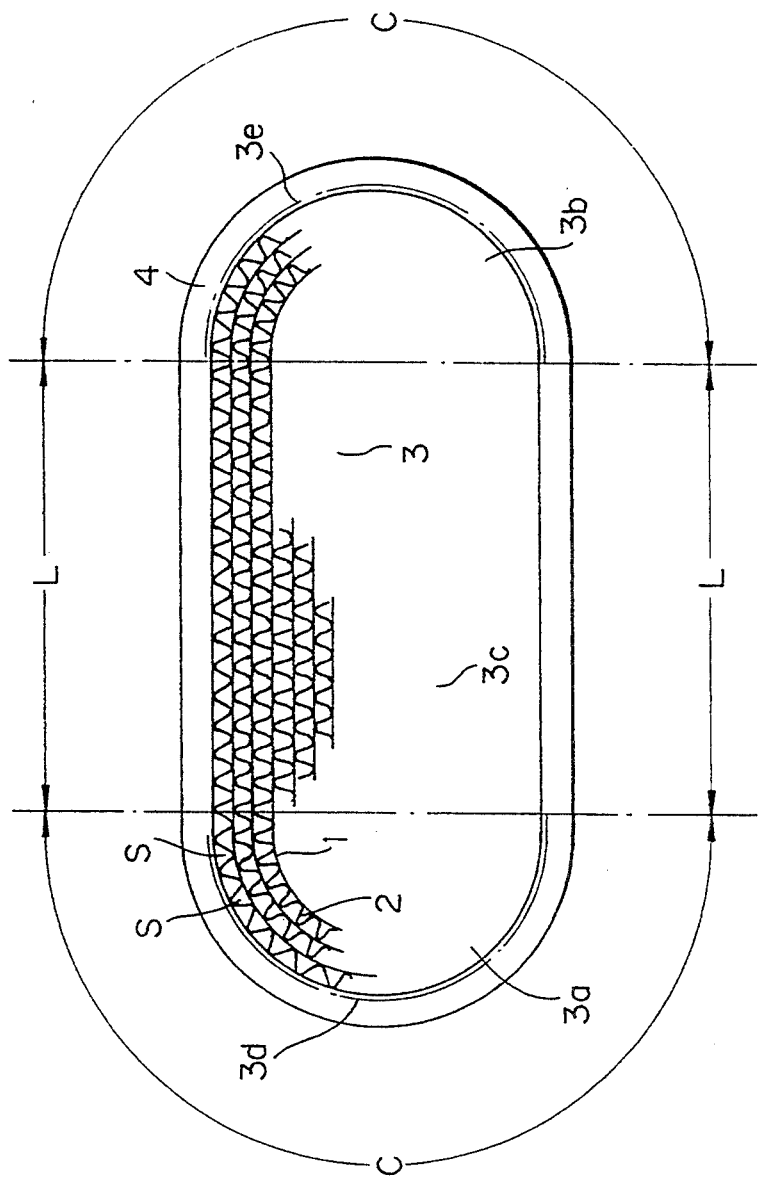
FIGS. 1A and 1B show an embodiment of the metal catalyst carrier according to the first aspect of the present invention, in cross sectional view.

FIG. 1A shows a metal catalyst carrier according to the present invention, in cross sectional view. The catalyst carrier comprises a metal honeycomb column 3 with a quasi-elliptical or racetrack-like cross section defined by a pair of mutually facing linear portions "L" and a pair of mutually facing curved portions "C", the honeycomb column being fittingly enclosed by a columnar metal case 4 having the same cross sectional shape as the honeycomb 3. The columnar case has a major axis of 170 mm, a minor axis of 86 mm and a column axis of 120 mm.

This metal honeycomb column is fabricated from flat and wavy sheets or foils of a heat-resisting ferritic stainless steel by winding a laminate of the flat sheet 1 and the wavy sheet 2 around a mandrel while bonding the sheets 1 and 2 being wound at several points on the lines at which the flat surface of the flat sheet 1 and the wave peak of the wavy sheet 2 meet, by using laser-spot welding or the like, and cutting the sheets 1 and 2 when the wound coil has a predetermined diameter. The mandrel is withdrawn from the coil, which is then pressed between a pair of flat jigs to form a quasi-elliptical honeycomb column 3. Spaces defined and enclosed by the flat and wavy sheets 1 and 2 form numerous gas flow paths "S" extending along the column axis. The inner wall of these spaces "S" acts as an actual catalyst carrier.

The rate of bonding by laser-spot welding of the sheets 1 and 2 is 0.2 to 0.4% in the major axial end portions 3a and 3b. The rate of bonding or bond rate is defined as a quotient obtained by dividing a bonded area by a total area in which the laminated and wound flat and wavy sheets meet or are in contact with each other. The laser-spot welding is not performed in the other portion, i.e., an intermediate rectangular portion 3c between the end portions 3a and 3b.

Both of the column axial ends of the thus-prepared honeycomb column 3 are subjected to electrical discharge machining using a flat electrode larger than the column ends 7 to bond entire edges of the wound sheets 1 and 2 on the column ends, so that the major axial end portions 3a and 3b have a bond rate of from 0.3 to 0.5% and the intermediate rectangular portion 3c has a bond rate of 0.1%. The outer circumferential surface of the honeycomb column 3 and the inner circumferential surface of the columnar case 4 are laser-welded only in the major axial end portions or curved portions 3d and 3e.

Figure 2:
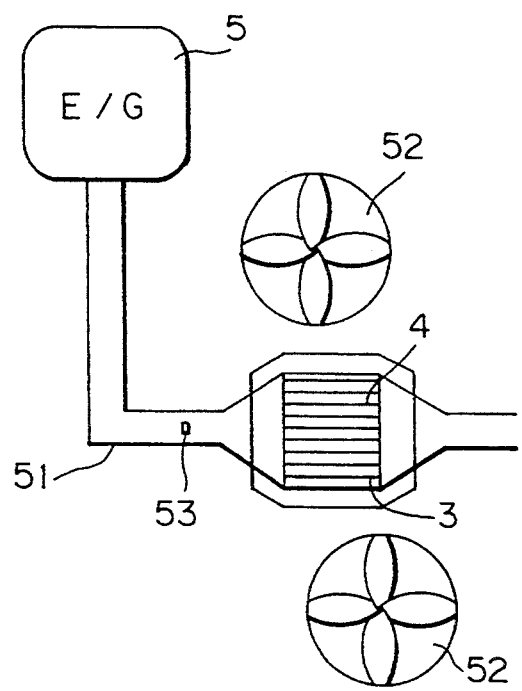
FIG. 2 shows an arrangement for testing the heat durability of catalyst carriers.

The obtained metal catalyst carrier is tested for the heat durability by using a testing arrangement shown in FIG. 2, in which the catalyst carrier is placed within an exhaust pipe 51 of an automobile engine 5, with cooling blowers 52 disposed on both sides of the catalyst carrier and a temperature sensor 53 attached to the surface of the pipe 51 upstream of the catalyst carrier.

Figure 3:
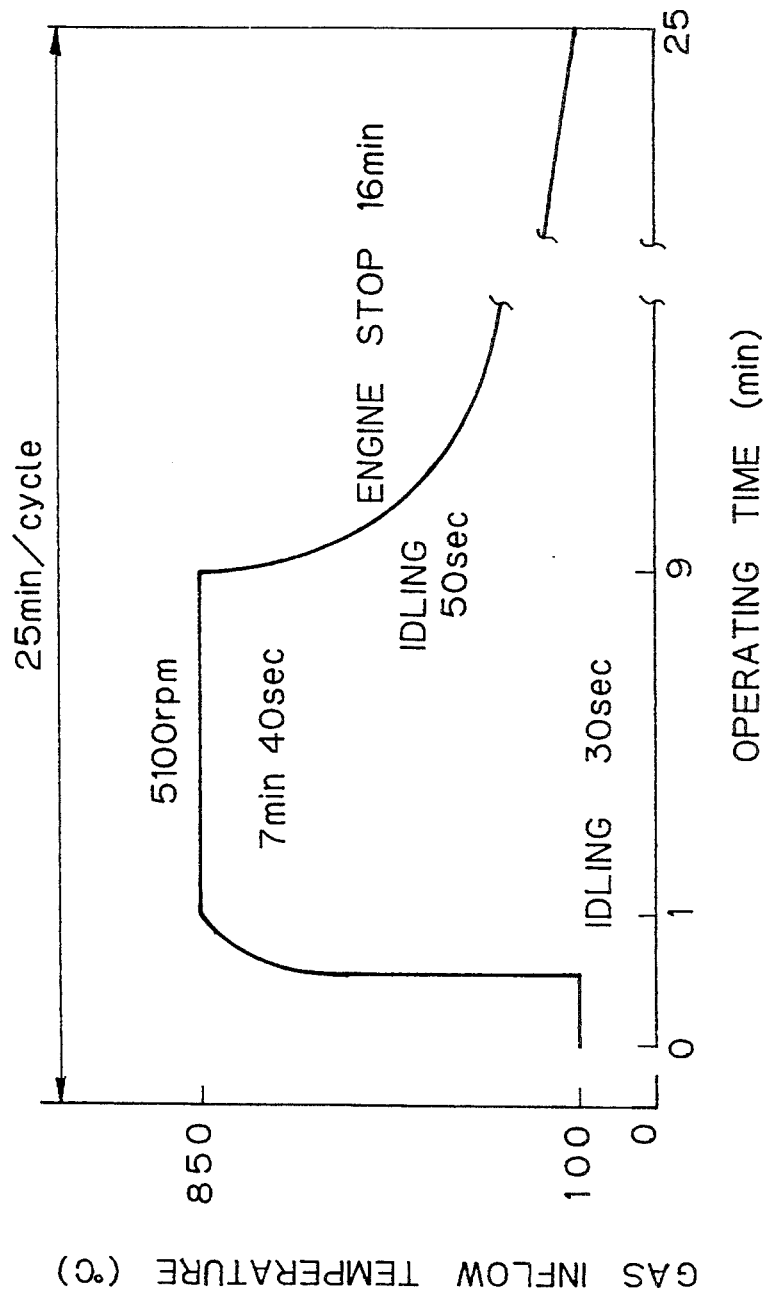
FIG. 3 is a graph showing a thermal stress cycle used in the heat durability test.

The catalyst carrier thus arranged is subjected to repeated thermal stress cycles as shown in FIG. 3, i.e., the engine 5 is idled for 30 sec (measured temperature is 100° C.) and the engine speed is then raised to 5100 rpm while the measured temperature rises to 850° C. and is held there for 7 min 40 sec. The engine is slowed down again to the idling state, maintained for 50 sec and then stopped, followed by blowing the catalyst carrier by the blowers 52 for 16 min. This cycle was repeated 900 times.

The test results for 12 samples are summarized in Table 1, from which it can be seen that no displacement occurs between the flat and wavy sheets 1 and 2 in Samples 3, 5 and 7 having C1/C2 values greater than unity according to the present invention, particularly C1/C2 values of from 2 to 5, preferably from 3 to 5, in which samples the bond rate values are from 0.3 to 0.5 and 0.1 in the major axial end portions (3a, 3b) and in the intermediate rectangular portion (3c), respectively, and the honeycomb 3 and the case 4 are bonded only in the curved portions 3d and 3e, as stated above.

These results are considered to be brought about by the following mechanism. At elevated temperatures, both the honeycomb 3 and the case 4 shrink in the major axial direction while expand in the minor axial direction, but the major axial end portions 3a and 3b do not substantially deform. Therefore, the greater bond rate and the resulting higher rigidity suppresses the exfoliation between the honeycomb 3 and the case 4. If the bond rate of the honeycomb 3 were greater in the intermediate rectangular portion 3c than in the end portions 3a and 3b, the intermediate portion 3c would have a greater rigidity than the end portions 3a and 3b and could not follow the thermal expansion of the case 4, causing a gap to generate between the honeycomb 3 and the case 4 with the result that the exhaust gas leaking through the gap is not purified.

If the honeycomb 3 and the case 4 are bonded over the entire circumferences thereof, the thermal expansion in the minor axial direction will cause the honeycomb 3 to be pulled and forced to deform by the case 4, also causing exfoliation therebetween.

Figure 1B:
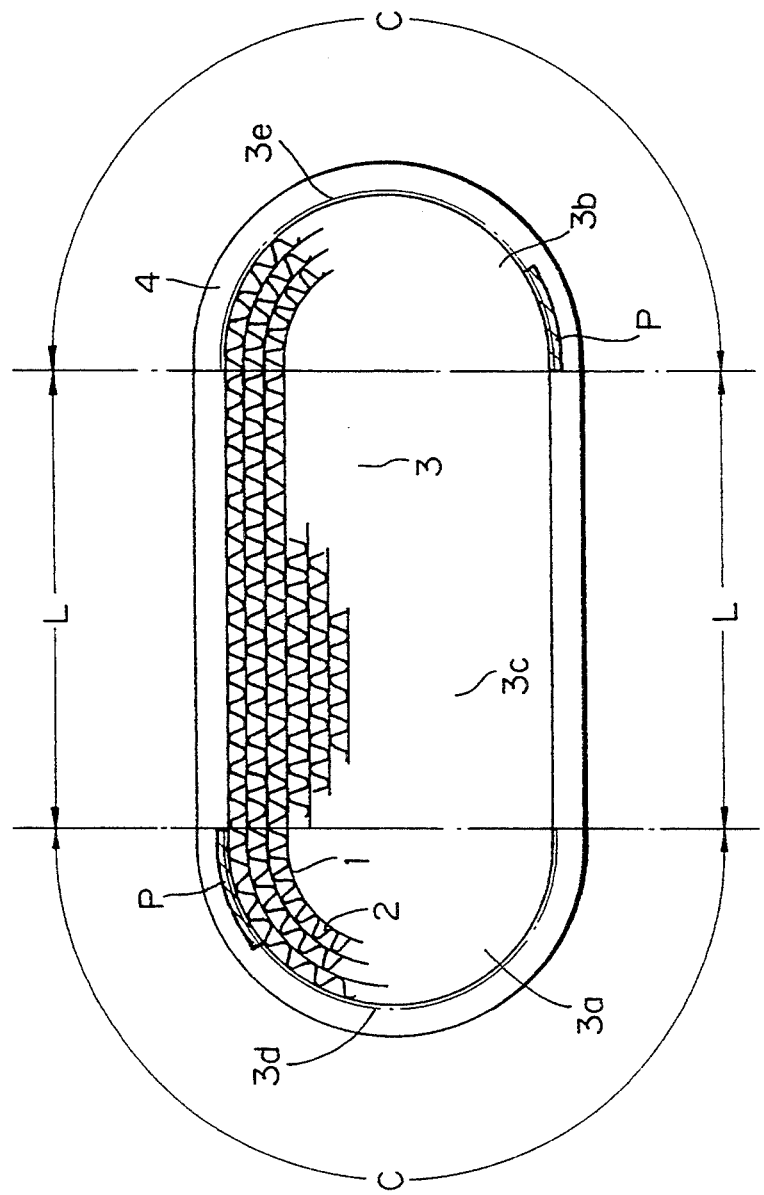

In the major axial end portions or curved portions 3d and 3e, the outer circumferential surface of the honeycomb 3 and the inner circumferential surface of the case 4 may not be entirely welded as described above but may be partially bonded by laser or TIG welding, particularly in the portions "P" of the curved portions 3d and 3e that adjoin the linear portions "L", as shown in FIG. 1B.

EXAMPLE 2

Figure 4:
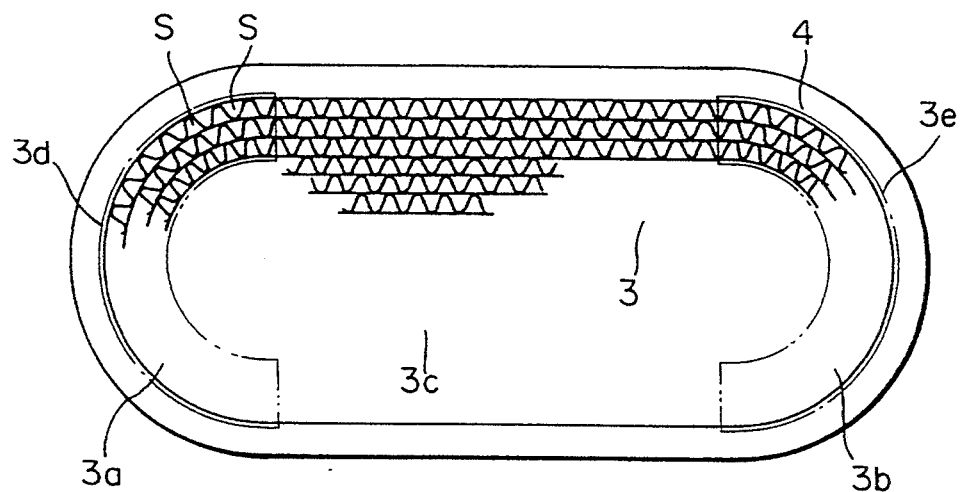
FIG. 4 shows another embodiment of the metal catalyst carrier according to the present invention, in cross sectional view.

As shown in FIG. 4, the major axial end portions 3a and 3b, which should have a greater bond rate, may be a "C" shaped band with a certain width along the inner circumference of the curved portions 3d and 3e of the case 4, instead of those with a semicircular shape also referred to as 3a and 3b in Example 1 and shown in FIG. 1. In this case, the intermediate portion 3c includes the semicircular cores surrounded by the band-shaped end portions 3a and 3b as well as the rectangular portion 3c as referred to in Example 1.

In this Example, good results are obtained when the bond rate between the flat and wavy sheets is greater in the major axial end portions (C1) than in the other portion (C2), specifically under the C1/C2 values falling within the range of from 2 to 5, as can be seen from Samples 14, 15 and 16 in comparison with Comparative Sample 13, which are also summarized in Table 1.

The C1/C2 value according to the present invention may not be limited to 5 or less but may be greater than 5, but is preferably within the range of from 2 to 5 to avoid unnecessary cost rise.

The advantage as stated above, according to the first aspect of the present invention, can be obtained when brazing is used instead of welding.

TABLE 1

| Sample No. | Bond rate C1(*1) | C2(*2) | C1/C2 | Weld between honeycomb-case | Heat durability |
|---|---|---|---|---|---|
| 1 | 0.1% | 0.1% | 1 | Curve only(*3) | NG 1(*5) |
| 2 | 0.1 | 0.1 | 1 | Entire(*4) | NG 1 |
| 3 | 0.2 | 0.1 | 2 | Curve only | Good |
| 4 | 0.2 | 0.1 | 2 | Entire | NG 1 |
| 5 | 0.3 | 0.1 | 3 | Curve only | Very good |
| 6 | 0.3 | 0.1 | 3 | Entire | NG 1 |
| 7 | 0.5 | 0.1 | 5 | Curve only | Very good |
| 8 | 0.5 | 0.1 | 5 | Entire | NG 1 |
| 9 | 0.3 | 0.3 | 1 | Curve only | NG 2(*6) |
| 10 | 0.3 | 0.3 | 1 | Entire | NG 1 |
| 11 | 0.5 | 0.5 | 1 | Curve only | NG 2 |
| 12 | 0.5 | 0.5 | 1 | Entire | NG 1 |
| 13 | 0.1 | 0.1 | 1 | Curve only | NG 1 |
| 14 | 0.2 | 0.1 | 2 | Curve only | Good |
| 15 | 0.3 | 0.1 | 3 | Curve only | Very good |
| 16 | 0.5 | 0.1 | 5 | Curve only | Very good |

(Note)
*1) C1: bond rate in the major axial end portions
*2) C2: bond rate in the intermediate portion
*3) Curve only: welded only in the curved portions
*4) Entire: welded over the entire circumference
*5) NG 1: displacement between flat and wavy sheets
*6) NG 2: gap between honeycomb and case

EXAMPLE 3

Figure 5:
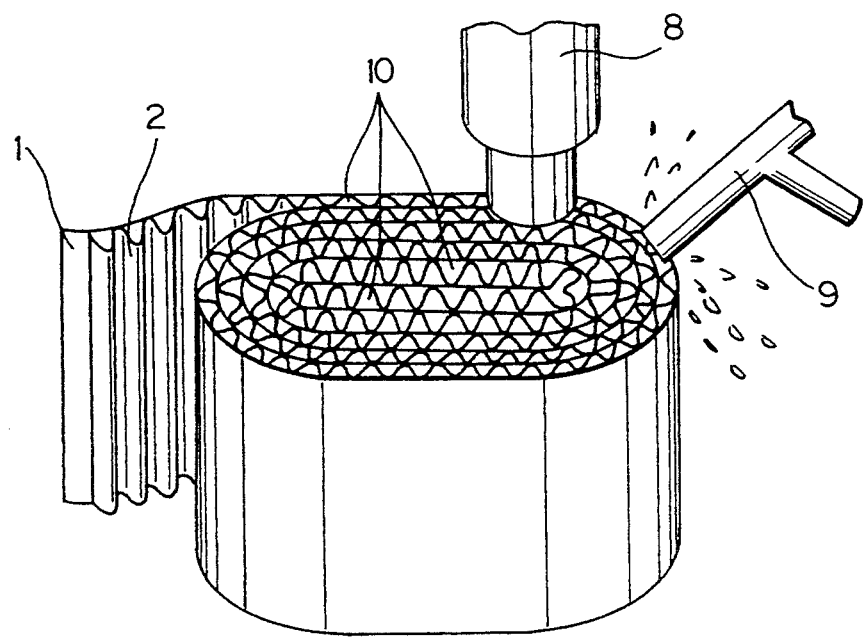
FIG. 5 shows a metal honeycomb column being fabricated according to the present invention, in perspective view.
Figure 6A:
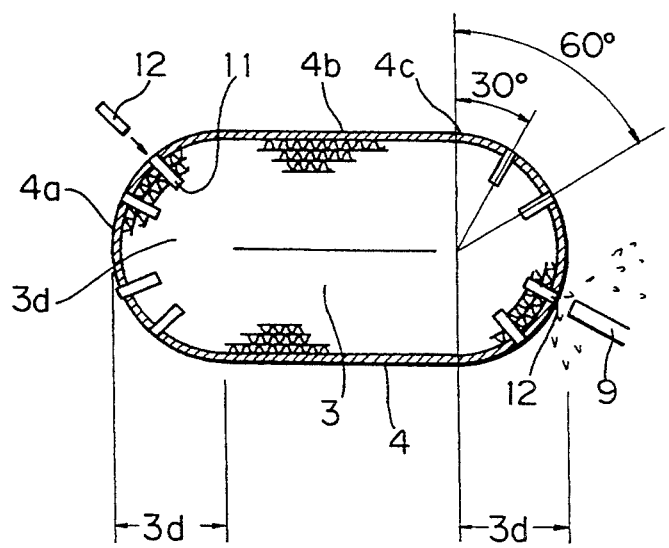
FIGS. 6A and 6B show a metal catalyst carrier being fabricated according to the present invention, in cross sectional and front views, respectively.
Figure 6B:
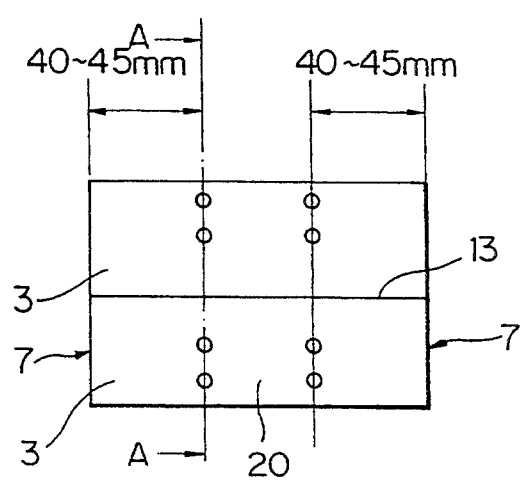

A metal catalyst carrier according to the second aspect of the present invention is fabricated in such manner as shown in FIGS. 5 through 7.

First referring to FIG. 5, a metal honeycomb column 3 is fabricated of flat and wavy metal sheets 1 and 2 laminated, wound together and bonded to each other, in the same sequence as used in Example 1.

As can be best seen from FIG. 6A, the honeycomb column 3 has a quasi-elliptical cross section defined by a pair of mutually facing linear portions 4b and a pair of mutually facing curved portions 4a, usually referred to as a racetrack shape.

By using an electrical discharge machine 8 or a tungsten-inert gas (TIG) welder 9, the sheets 1 and 2 are bonded to each other on the both side edges thereof, i.e., in the column end face 7 (FIG. 6A) at which numerous gas flow paths 10 open. The honeycomb 3 and a columnar metal case 4 are drilled or electrical discharge-machined in the curved portions thereof to form holes 11 extending from the case 4 through to inside of the honeycomb 3. Metal pins 12 are fittingly pressed into the holes 11 so as to fill the holes 11, leaving remains protruding 0.1 to 5 mm from the outer surface of the case 4. The pins 12 are then bonded to the case 4 by TIG welding from outside. The pins 12 are located in the curved portions 4a, preferably at 30 and 60 degrees from the end point 4c of the linear portion 4b and at 40 to 45 mm from the column end face 7.

With the honeycomb 3 placed therein, the columnar case 4 formed from a metal strip is then TIG-welded at the mating line 13 of the strip ends to enclose the honeycomb therein and complete a metal catalyst carrier 20.

The holes 11 may be formed either separately in the honeycomb 3 and the case 4 before assembly, if alignment thereof is ensured, or simultaneously in case when these two have been assembled.

The metal pins 12 must be provided in the curved portions 4a to prevent the honeycomb 3 from slipping through the case 4 due to the exhaust gas flow pressure. The pins 12, when provided in the linear portions 4b, would slip through the honeycomb 3 because of the expansion of the linear portions 4b upon the thermal deformation of the case 4, reducing the resistance to slip of the honeycomb 3 out of the case 4. The curved portion 4a is far less thermally deformable than the linear portion 4b and the pins 12 when provided in the curved portion 4a would not slip out of the honeycomb 3 even upon the thermal deformation of the case 4.

The provision of the pins 12 thus fastens the honeycomb 3 to the case 4 without substantially affecting the pressure loss of an exhaust gas flow through the catalyst carrier 20 (or the pressure differential across the catalyst carrier 20) because the curved portion 4a only provides a minor proportion of the total exhaust gas flow path.

The flat and wavy sheets 1 and 2 are made of a heat-resisting ferritic stainless steel and have a sheet thickness of 50 mm. The wavy sheet 2 has a wave pitch of 1.25 mm. The columnar metal case 4 is made of a heat-resisting ferritic stainless steel and has a wall thickness of 1.5 mm. The metal pins 12 are also made of a heat-resisting ferritic stainless steel and preferably have a diameter of 5 mm and a length of about 15 to 20 mm. The metal pins 12 may not have a circular section as shown in FIGS. 7A and 7B, but may have square or H-shaped sections as shown in FIGS. 7C and 7D. The metal pins 12 may have a throughhole 22 to reduce the pressure loss, as shown in FIGS. 7B to 7D.

The advantageous features of the embodiment of Example 3 are demonstrated by the following tests.

Figure 8:
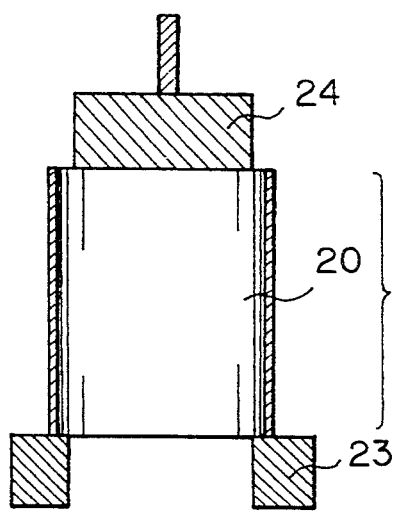
FIG. 8 show an arrangement for testing the slip-off strength of honeycomb columns, in vertical sectional view.

To study the slip strength, an Amsler slip test was carried out at room temperature by using an arrangement as shown in FIG. 8, for the metal catalyst carrier 20 of Example 3 and a comparative sample 1 having the same construction, except that the metal pins 12 are not used, but instead, the honeycomb 3 and the case 4 are bonded by laser welding in the portions corresponding to those in which the pins 12 are inserted in case of Example 3.

These metal catalyst carriers were held by a base 23 on one end in the circumference, and on the other end, were pressed by a pressing bar 24 until the honeycomb 3 slipped through the case 4.

Figure 9:
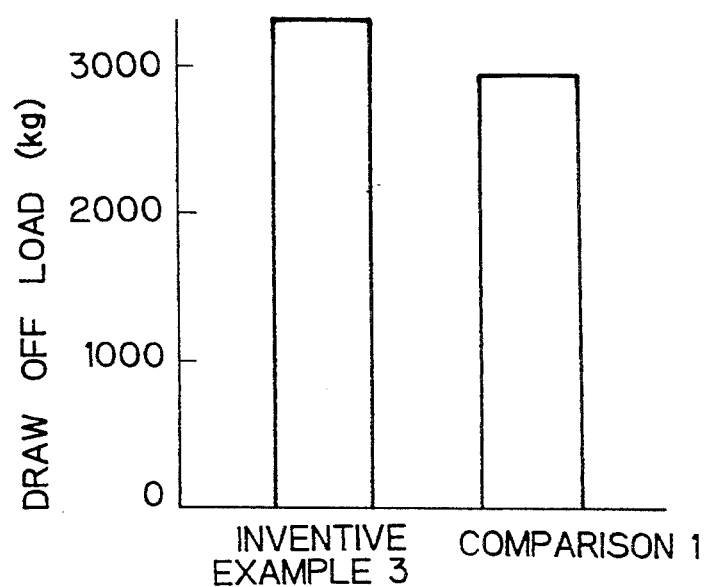
FIG. 9 is a graph showing the draw off load of the honeycomb column of the metal catalyst carrier according to the present invention in comparison with that of a conventional catalyst carrier.

The results are shown in FIG. 9, from which it can be seen that Example 3 of the present invention has substantially the same slip-off strength as comparative sample 1.

Figure 10:
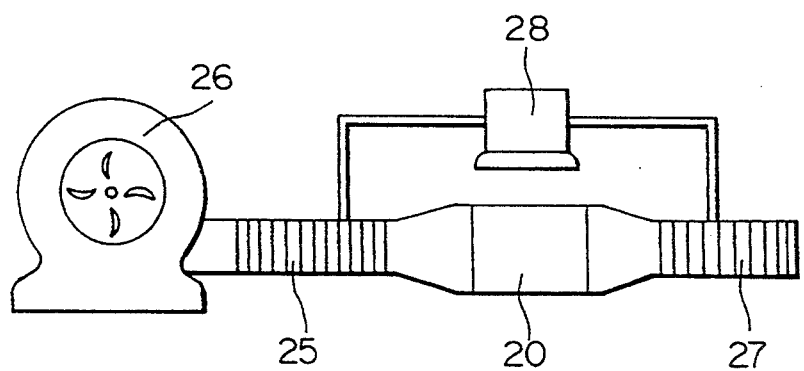
FIG. 10 shows an arrangement for testing the pressure loss.

The effect of the inserted metal pins 12 on the pressure loss was tested by using an arrangement as shown in FIG. 10, in which a blower 26 was connected in an airtight manner to the gas flow inlet end of the metal catalyst carrier 20. The blower 26 fed a pressurized air flow to the metal catalyst carrier 20 and a differential pressure gauge 28 measured the differential pressure between the inlet and outlet sides 25 and 27 of the metal catalyst carrier 20.

A comparative sample 2, tested under the same condition, was prepared in the same manner as the present inventive catalyst carrier 20, except that a honeycomb column 3 and a columnar metal case 4 were not fastened by the metal pins 12 but only bonded by laser welding.

Figure 11:
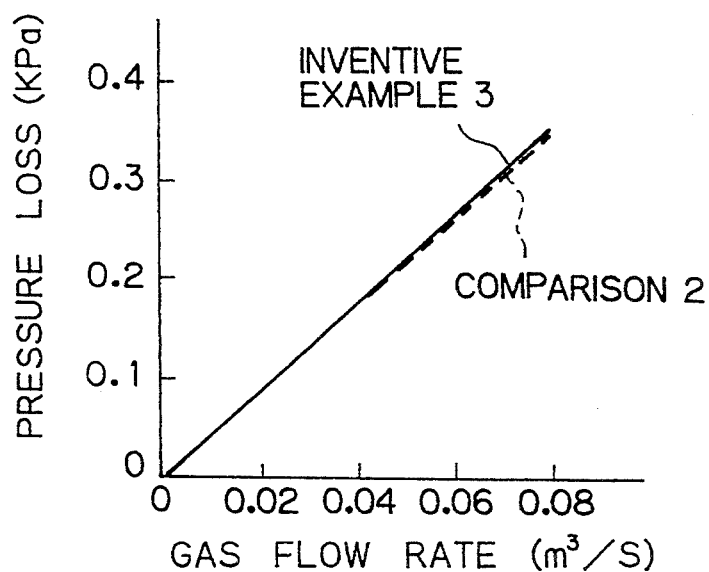
FIG. 11 is a graph showing the pressure loss of the metal catalyst carrier according to the present invention in comparison with that of a conventional catalyst carrier.

FIG. 11 shows the test results, from which it can be seen that the provision of the inserted metal pins 12 does not substantially affect the pressure loss under the tested condition covering the gas flow rate of 0.08 m³/s encountered when an automobile engine with a displacement of 2000 cc is operated at an engine speed of 6000 rpm.

The reason why the inserted metal pins 12 have no substantial effect on the pressure loss is thought to be that the curved portion 3d only provides a minor proportion of the total exhaust gas flow path.

Figure 12:
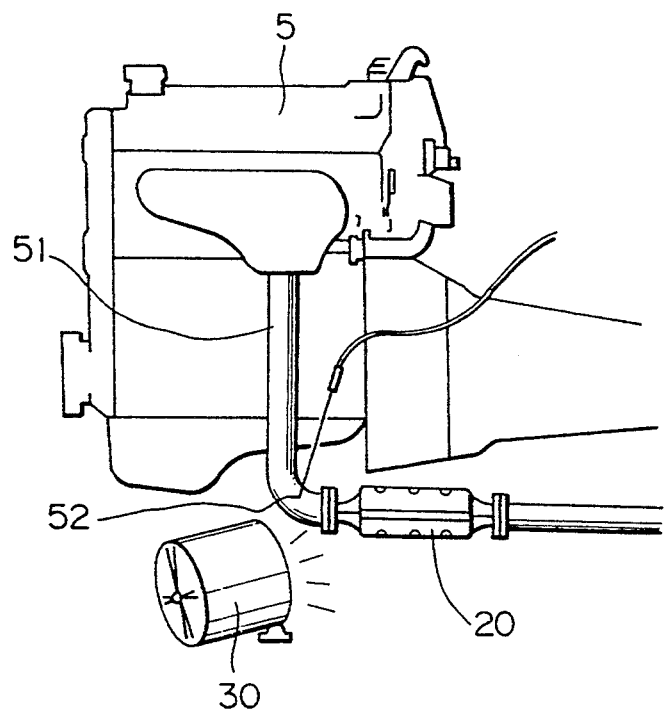
FIG. 12 shows another arrangement for testing the heat durability of catalyst carriers.

The heat durability of the metal catalyst carrier 20 of Example 3 according to the present invention was tested by using the arrangement shown in FIG. 12, in which the catalyst carrier 20 is placed in the exhaust pipe 51 of an automobile engine 5, with a cooling blower 30 disposed in the position suitable for feeding a cooling air to the catalyst carrier 20 and a temperature sensor 52 attached to the surface of the pipe 51 upstream of the catalyst carrier 20.

The catalyst carrier 20 thus arranged is subjected to repeated thermal stress cycles as shown in FIG. 3, as is already described in Example 1.

Comparative Sample 3, tested under the same condition, was prepared in the same manner as the present inventive catalyst carrier 20, except that a honeycomb column 3 and a columnar metal case 4 were not fastened by the metal pins 12 but only bonded by laser welding.

Figure 13:
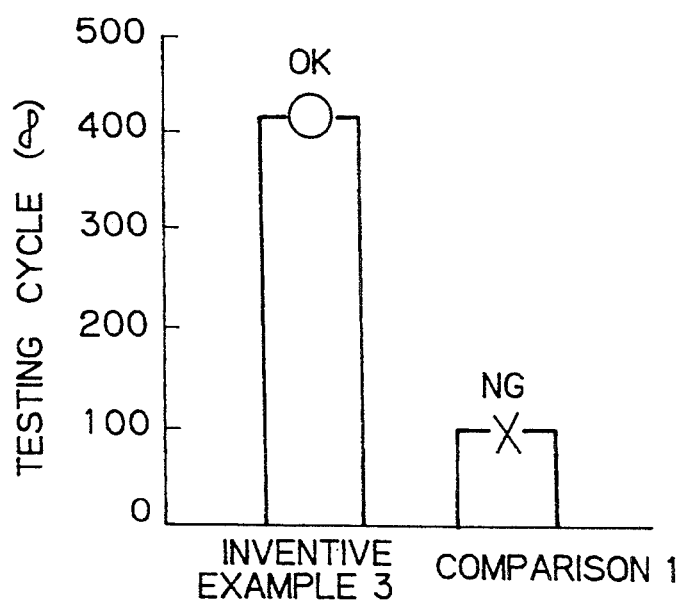
FIG. 13 is a graph showing the heat durability of the metal catalyst carrier according to the present invention in comparison with that of a conventional catalyst carrier.

FIG. 13 shows the test result, from which it can be seen that, in the Comparative Sample 3, the honeycomb column 3 retreated through the columnar metal case 4 toward the gas flow outlet end of the catalyst carrier, whereas the catalyst carrier 20 according to the present invention exhibited a heat durability of 400 cycles or more.

EXAMPLE 4

FIGS. 14A to 14C and FIGS. 15A to 15C show a preferred embodiment of the metal catalyst carrier according to the second aspect of the present invention, in which a laser beam is applied onto the outer surface of the columnar metal case 4 to further improve the bonding between the honeycomb 3 and the case 4.

Figure 14A:
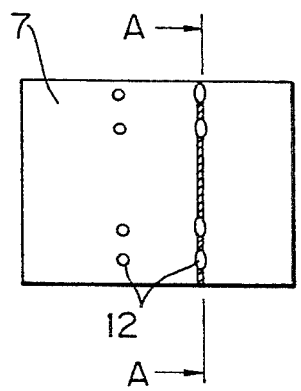
FIGS. 14A, 14B and 14C show a preferred embodiment of the metal catalyst carrier according to the present invention, in front, top and cross sectional views, respectively.
Figure 14B:
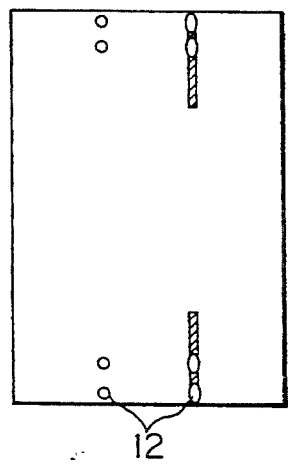
Figure 14C:
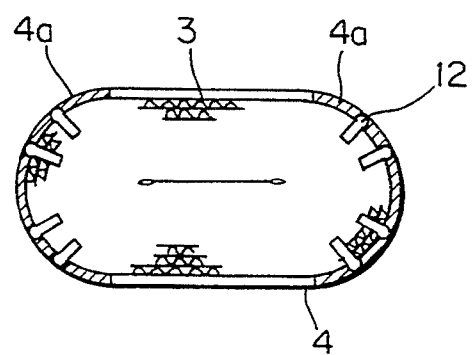

In the embodiment shown in FIGS. 14A to 14C, a laser beam is applied on the case surface only in the curved portions 4a along the line on which the metal pins 12 have been provided. This embodiment further increase the retreat resistance of the honeycomb column 3.

Figure 15A:
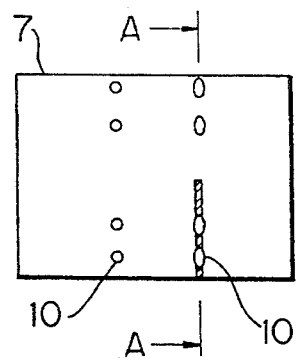
FIG. 15A, 15B and 15C show another preferred embodiment of the metal catalyst carrier according to the present invention, in front, top and cross sectional views, respectively.
Figure 15B:
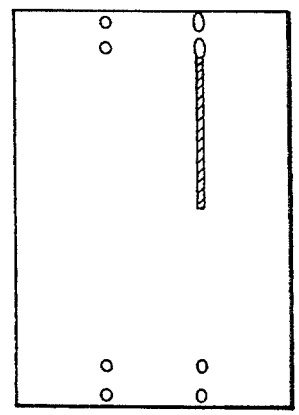
Figure 15C:
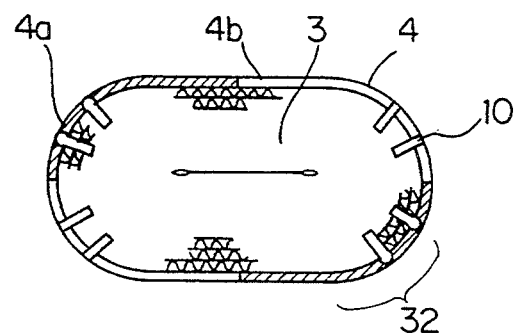

In the embodiment shown in FIGS. 15A to 15C, a laser beam is applied on the case surface in the portions 32 bridging part of the curved portions 4a and part of the linear portions 4b. This embodiment enables the bond between the honeycomb 3 and the case 4 to be further strengthened particularly in the linear portions 4a.

In Example 4, TIG welding may be used instead of the laser welding.

EXAMPLE 5

Figure 17A:
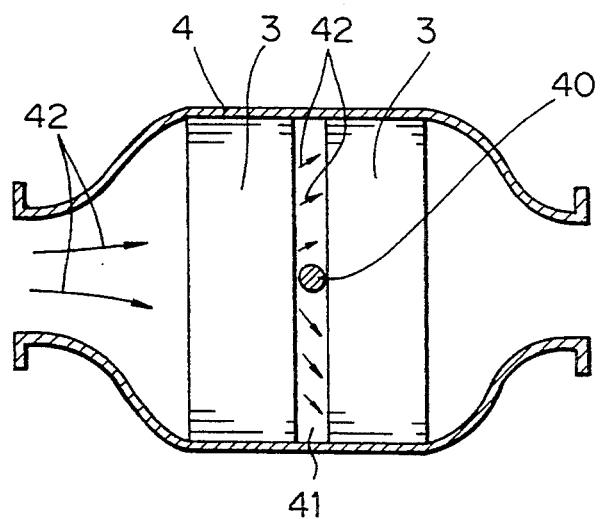
FIGS. 17A and 17B show the metal catalyst carrier of FIG. 16, in horizontal and vertical sectional views, respectively.
Figure 17B:
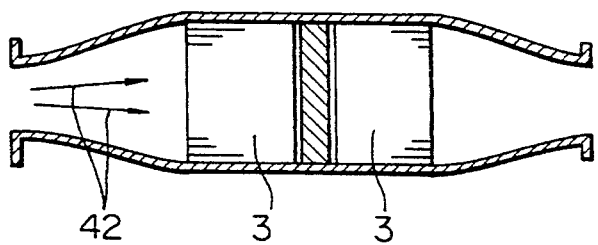

FIGS. 16, 17A and 17B show another preferred embodiment according to the second aspect of the present invention, in which a columnar metal case 4 is provided with a metal support member or connecting rod 40 disposed therein for connecting the mutually facing linear portions 4b to suppress thermal deformation of the case 4.

In this embodiment, a plurality of honeycomb columns 3 are bonded to the columnar case 4 in the same manner as used in Examples 3 or 4. The honeycomb columns 3 are disposed so as to leave a space 41 therebetween. The mutually facing linear portions 4b of the case 4 are connected to each other within the space 41 left between the honeycombs 3, via the connecting rod 40 bonded to the linear portions 4b on both ends thereof.

This embodiment advantageously suppresses thermal deformation of the linear portions 4b of the case 4, and thereby, further improves the resistance to retreat of the honeycomb column 3.

Further, the exhaust gas purification reaction is advantageously improved, because an exhaust gas flow 42 becomes turbulent in the space 41 between the honeycombs 3 and is also directed to the circumferential region of the cross section of the honeycombs 3; the gas flow 42 would otherwise tend to concentrate in the core region of the section of the honeycomb 3.

Figure 18A:
FIGS. 18A to 18D show connecting rods with different shapes according to the present invention, in cross sectional view.
Figure 18B:
Figure 18C:
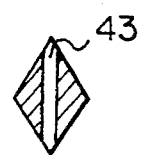
Figure 18D:
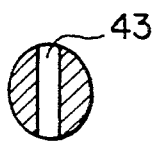

The connecting rod 40 may either have polygonal cross sections as shown in FIGS. 18A to 18C or a circular cross section as shown in FIG. 18D. The connecting rod 40 may be provided with a throughhole 43 to reduce the pressure loss, as shown in FIGS. 18C and 18D. A plurality of connecting rods 43 may also be used.

We claim:

1. A metal catalyst carrier for exhaust gas purification, comprising:
   a metal honeycomb column composed of flat and wavy metal sheets that are laminated, wound together, and bonded to each other in alternating layers to provide numerous exhaust gas flow paths along a column axis corresponding to an axis around which said flat and wavy sheets are wound, said honeycomb column having a quasi-elliptical cross section defined by a pair of substantially parallel linear portions and a pair of curved portions such that said quasi-elliptical cross section is composed of a quadrilateral middle portion and two semi-circular end portions,
   said flat metal sheet and said wavy metal sheet being bonded to each other both in said linear portions and in said curved portions, said flat and wavy sheets being bonded at a greater rate in said two semi-circular end portions than in said quadrilateral middle portion, said bond rate being defined as a quotient obtained by dividing a bonded length by a total length of lines on which said laminated and wound flat and wavy sheets are in contact with each other; and
   a columnar metal case fittingly enclosing said honeycomb column only in the portions corresponding to said semicircular end portions of said quasi-elliptical cross section.

2. A metal catalyst carrier for exhaust gas purification according to claim 1, wherein said flat and wavy metal sheets are bonded to provide a value C1/C2 of 2 or more, where C1 and C2 are values of said bond rate in said major axial end portions and in the portion between these portions of said quasi-elliptical cross section, respectively.

3. A metal catalyst carrier for exhaust gas purification according to claim 1, wherein said flat and wavy metal sheets are bonded to provide a value of C1/C2 of from 2 to 5, where C1 and C2 are values of said bond rate in said semi-circles and in the area between said two linear portions of said quasi-elliptical cross section, respectively.

4. A metal catalyst carrier for exhaust gas purification according to claim 1, wherein a catalyst for exhaust gas purification is carried on said flat and wavy metal sheets.

5. A metal catalyst carrier for exhaust gas purification according to claim 1, wherein the flat metal sheet and the wavy metal sheet are bonded to each other at a bond rate of 0.1% or more.

6. A metal catalyst carrier for exhaust gas purification, comprising:
   a metal honeycomb column composed of flat and wavy metal sheets laminated, wound together, and bonded to each other in alternating layers to provide numerous exhaust gas flow paths along a column axis corresponding to an axis for winding said flat and wavy sheets, said honeycomb column having a quasi-elliptical cross section defined by a pair of generally parallel facing linear portions and a pair of facing curved portions such that said quasi-elliptical cross section is composed of a quadrilateral middle portion and two semi-circular end portions, said flat and wavy sheets being bonded in a greater bond rate in said two semi-circular end portions than in said quadrilateral middle portion, said bond rate being defined as a quotient obtained by dividing a bonded length by a total length of lines on which said laminated and wound flat and wavy sheets are in contact with each other;
   a columnar metal case fittingly enclosing said honeycomb column; and
   a metal member extending from said columnar metal case through to the inside of said enclosed metal honeycomb column only in a portion corresponding to said semi-circular end portions of said quasi-elliptical cross section to fasten one to the other of the latter two,
   wherein said flat and wavy metal sheets are also bonded by welding in one of the portion corresponding to said semi-circular end portions and a portion bridging part of said semi-circular end portions and part of said linear portion, the flat metal sheet and the wavy metal sheet being bonded to each other both in the linear portions and the curved portions, said metal honeycomb column being bonded to the columnar metal case only in the curved portions.

7. A metal catalyst carrier for exhaust gas purification according to claim 6, comprising:
   a plurality of said metal honeycomb columns arranged with the column axes aligned and mutually facing column ends spaced apart in said columnar metal case; and
   a metal support member disposed within said space between said mutually facing ends of said metal honeycomb columns and having ends rigidly connected to mutually facing inner walls of said columnar metal case to connect and support said inner walls.

8. A metal catalyst carrier for exhaust gas purification according to claim 6, wherein said metal support member rigidly connects mutually facing inner walls of said columnar metal case in the portion corresponding to said linear portion.

9. A metal catalyst carrier for exhaust gas purification according to claim 6, wherein a catalyst for exhaust gas purification is carried on said flat and wavy metal sheets.

10. A metal catalyst carrier for exhaust gas purification according to claim 6 wherein the flat metal sheet and the wavy metal sheet are bonded to each other at a bond rate of 0.1% or more.

* * * * *